United States Patent [19]
LaCasse

[11] Patent Number: 5,747,731
[45] Date of Patent: May 5, 1998

[54] SPACING DEVICE FOR UTILITY WIRE

[75] Inventor: Gaston LaCasse, St-Henri-de-Lévis, Canada

[73] Assignee: IPL, Inc., St-Damien-de-Bellechasse, Canada

[21] Appl. No.: 854,328

[22] Filed: May 12, 1997

[51] Int. Cl.[6] .................................................. H02G 7/00
[52] U.S. Cl. ........................................ 174/40 CC; 248/61
[58] Field of Search ........................... 174/40 CC, 41,
174/146, 117 F, 168, 191, 197, 38, 138 G,
40 R, 43, 42; 248/61, 63, 68.1, 49, 72;
138/112

[56] References Cited

U.S. PATENT DOCUMENTS

| | | | |
|---|---|---|---|
| 1,764,629 | 6/1930 | Houts | 248/49 |
| 2,064,290 | 12/1936 | Campbell | 248/72 |
| 2,820,083 | 1/1958 | Hendrix | 174/43 |
| 2,912,482 | 11/1959 | Horrocks | 174/146 |
| 2,934,587 | 4/1960 | Duffy | 174/41 |
| 2,934,594 | 4/1960 | Duffy | 174/41 |
| 4,069,765 | 1/1978 | Müller | 104/123 |
| 4,314,092 | 2/1982 | Fleming et al. | 174/38 |
| 4,663,496 | 5/1987 | Peek, Jr. | 174/42 |
| 5,021,612 | 6/1991 | Joffe | 174/146 |
| 5,463,189 | 10/1995 | Deneke et al. | 174/138 |

*Primary Examiner*—Bot L. Ledynh
*Assistant Examiner*—Dhiru R. Patel
*Attorney, Agent, or Firm*—Joseph W. Molasky & Associates

[57] ABSTRACT

A device for use with one or more similarly constructed devices for spacing a utility wire from a supporting cable. The device has a top portion defining a U-shaped configuration including of opposite sides and of a bottom wall adapted to receive thereon the utility wire. The bottom portion has opposite side walls and a bottom wall adapted to receive thereagainst the supporting cable. The opposite sides of the top portion are spaced from another a distance so as to allow nesting therein of the bottom portion of a superposed similarly constructed device. A series of these devices may be nested together so that the spacing of the utility wire from its supporting cable may be varied in accordance with particular requirements.

8 Claims, 2 Drawing Sheets

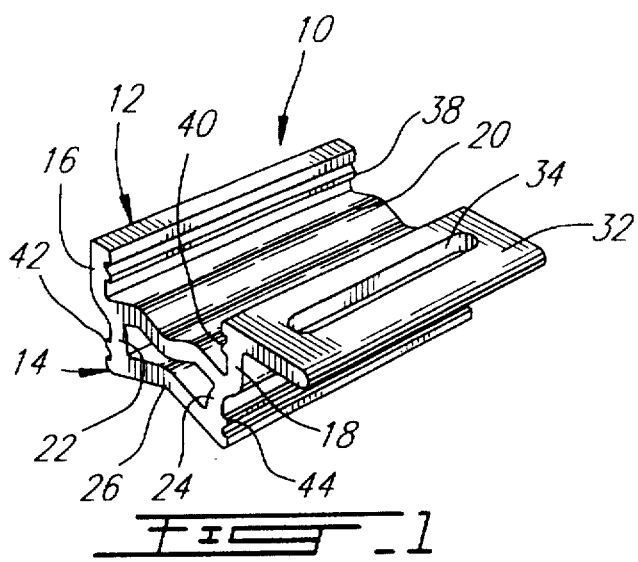
FIG_1
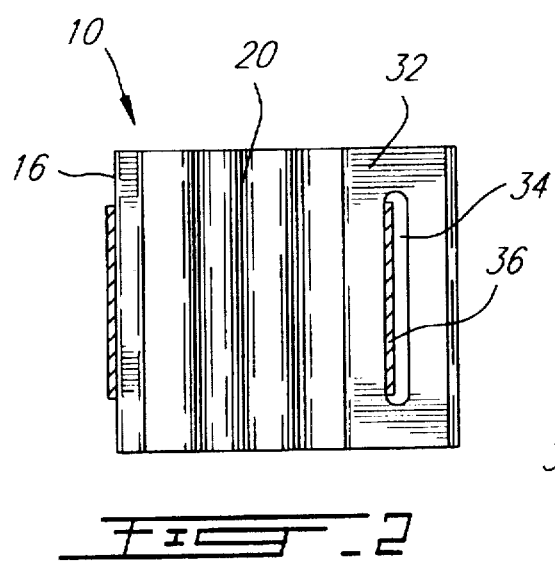
FIG_2
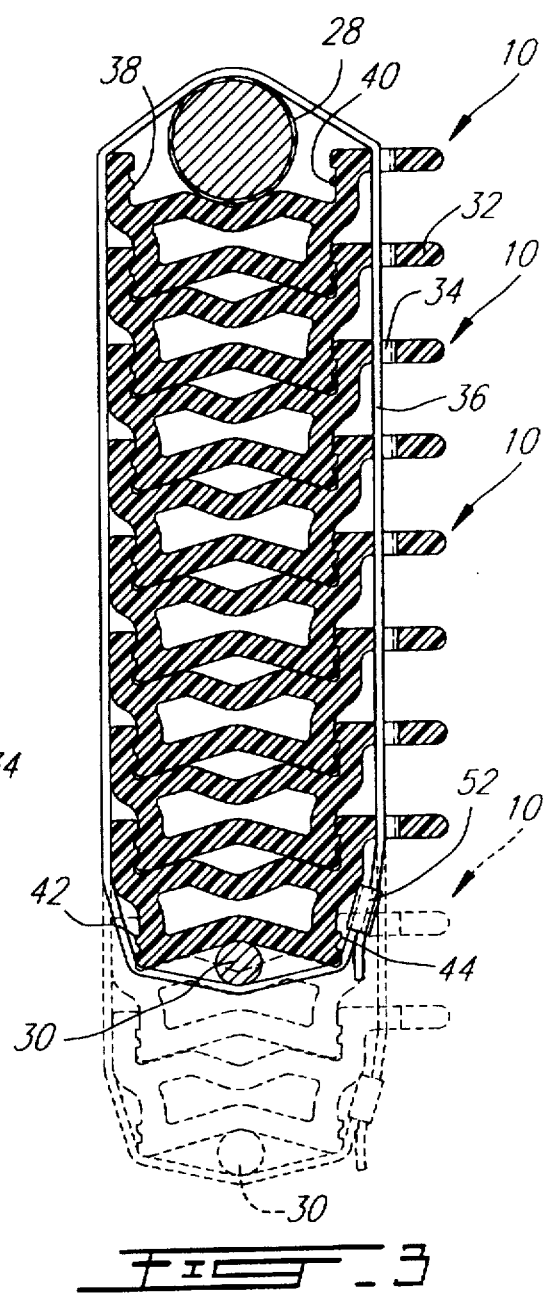
FIG_3

SPACING DEVICE FOR UTILITY WIRE

FIELD OF THE INVENTION

The present invention relates to a device for use with one or more similarly constructed devices for spacing a utility wire from its supporting cable.

BACKGROUND OF THE INVENTION

Utilities, such as telephone companies, use a steel cable in order to support a transmission wire between poles. At some locations, certain equipments (which are transformer-like devices) are installed near the poles. It is often require to progressively space the utility wire from its supporting cable near these equipments.

Spacers are used for distancing the utility wire from the supporting cable. At present, various sizes of spacers must be used to accommodate the varying distance between the cable and wire, thus resulting in the need of a large quantity of various sizes of spacers.

OBJECTS AND STATEMENT OF THE INVENTION

It is an object of the present invention to provide a spacer which avoids the above described problem with present spacers. This is achieved by providing a single spacer which is adapted to be engaged in nesting arrangement with similarly constructed spacers so that an assembly of such spacers can be made to suit the varying distance between wire and cable.

The present invention therefore relates to a device for assembly with one or more similarly constructed devices for spacing a utility wire from a supporting cable; it is formed of a body of plastics material having a top portion and a bottom portion; the top portion has a U-shaped configuration defined by opposite sides and a bottom wall adapted to receive thereon a utility wire; the bottom portion consists of opposite side walls and of a bottom wall adapted to receive thereagainst a supporting cable. The opposite sides of the top portion have facing inner walls spaced from one another a distance allowing nesting therein of the bottom portion of a superposed similarly constructed device; means are provided for securing the bottom portion in a nested position with the top portion of a superposed device whereby the spacing of a utility wire resting on the bottom wall of the uppermost device from its supporting cable received in the bottom wall of the lowermost device may be varied by nesting a corresponding number of devices.

In one preferred form of the invention, there are provided rib means on the inner walls of the top portion of the spacer which are adapted to correspondingly engage rib means on the sides of the lower portion of a nested spacer to secure the engagement of two superposed devices together.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is a perspective view of a device made in accordance with the present invention;

FIG. 2 is a top plan view thereof showing a restraining strap in cross section;

FIG. 3 is an elevational cross section of an assembly of similarly constructed devices made in accordance with the present invention spacing a utility wire from a supporting cable;

DESCRIPTION OF PREFERRED EMBODIMENTS

Figure 4:
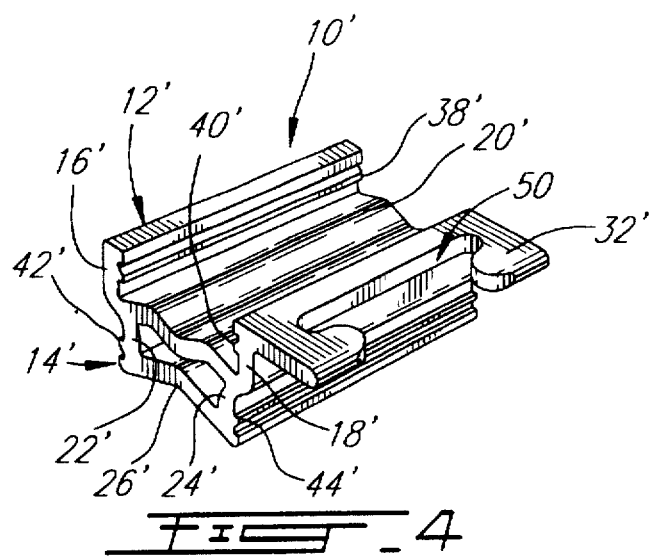
FIG. 4 is a perspective view showing another embodiment of a device made in accordance with the present invention.

Referring to FIGS. 1 and 2, there is shown a spacing device, generally denoted 10, made in accordance with the present invention. The device comprises a body that defines a top portion 12 and a bottom portion 14. The top portion has a U-shaped configuration defined by opposite sides 16, 18 and a bottom wall 20. The bottom portion consists of opposite sides 22 and 24 and of a bottom wall 26. Both bottom walls 20 and 26 define V-shaped configurations so that a utility wire 28 and a supporting cable 30 may properly rest against these walls respectively (see FIG. 3). A flange 32 integral with one side 18 of the device extends outwardly and horizontally therefrom. This flange 32 comprises a elongated slot 34 so that a strap or belt 36 may pass therethrough as explained further hereinbelow.

The opposite sides 16 and 18 of the top portion has inner walls provided with one or more longitudinal ribs 38 and 40, respectively while the outer walls of the opposite sides 22 and 24 of the bottom portion have one or more longitudinal ribs 42 and 44.

Figure 5:
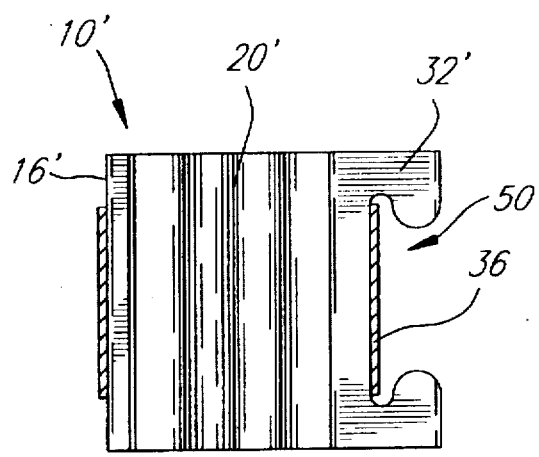
FIG. 5 is a top plan view of the device shown in FIG. 4.

Referring to FIGS. 4 and 5, there is shown another embodiment of a spacing device 10' made in accordance with the present invention. This device 10' is identical to the spacing device 10 of FIGS. 1 and 2 with one exception: the slot 34 in the first embodiment is replaced with a U-shaped opening 50 in order to receive the strap 36. Therefore, a detailed description of the spacing device 10' is not considered necessary; in the drawings, the parts similar to that of FIG. 1 bear the same reference numeral accompanied by a prime mark.

The device of the present invention is adapted for assembly with one or more similarly constructed devices for spacing the utility wire 28 from its supporting cable 30. This is achieved by nesting one or more of the devices 10, 10' in the manner illustrated in FIGS. 3 and 6. The distance separating the two walls 16 and 18, 16' and 18' is such that it may receive therebetween the lower portion of a superposed device 10, 10'. The devices 10, 10' are made of resilient plastics material so that the lower portion of a superposed device may be forcibly engaged between the side walls of their upper portion. To further assist in the engagement of the devices, ribs 42 and 44 on the outside walls of the lower portion of one device are adapted to engage the ribs 38 and 40 of the inner walls of the other device in which it is nested.

Figure 6:
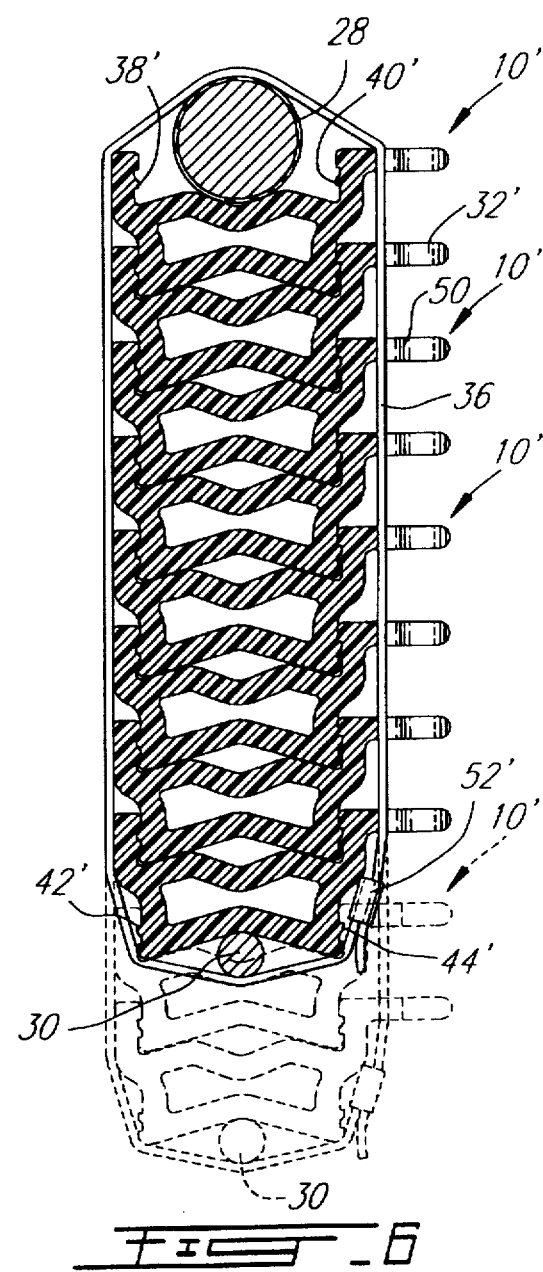
FIG. 6 is an elevation cross section showing the assembly of similarly constructed devices made in accordance with the present invention.

As can be seen in FIGS. 3 and 6, the distance separating the utility wire 28 from its supporting cable 30 may be varied by nesting one or more of these devices together. Once the assembly is formed in accordance with a desired distancing, the assembly may be secured together by means of the strap or belt 36 that extends either in the aligned slots 34 of the embodiment of FIGS. 1 and 2 or in the aligned U-shaped openings 50 of the embodiment illustrated in FIGS. 4 and 5. The free ends of the strap are secured at 52.

One preferred plastics material for the device of the present invention is polyvinylchloride. This material has some resiliency so that side walls 16, 18 or 16', 18' will flex outwardly if one device is forcingly engaged with another device, in which case the ribs may not be necessary as the devices will be secured by friction.

Although the invention has been described above in relation to two specific forms, it will be evident to a person skilled in the art that it may be modified and refined in various ways. It is therefore wished to have it understood that the present invention should not be limited in scope, except by the terms of the following claims.

I claim:

1. A device for assembly with more than one similarly constructed devices for spacing a utility wire from a supporting cable comprising: a body formed of plastics material and defining a top portion and a bottom portion; said top portion having a U-shaped configuration defined by opposite sides and a bottom wall adapted to receive thereon said utility wire; said bottom portion consisting of opposite side walls and of a bottom wall adapted to receive thereagainst said supporting cable; said opposite sides of said top portion having facing inner walls spaced from one another a distance allowing nesting therein of the bottom portion of a superposed similarly constructed device; means securing said bottom portion in a nested position with the top portion of a superposed device whereby the spacing of said utility wire resting on the bottom wall of the uppermost device of said assembly of said constructed devices from said supporting cable bearing against the bottom wall of the lowermost device of said assembly may be varied by nesting a corresponding number of said constructed devices.

2. A device as defined in claim 1, whereby said securing means consist of rib means on said inner walls of said top portion correspondingly engaging rib means on said sides of said bottom portion.

3. A device as defined in claim 1 or claim 2, whereby said bottom wall of said top portion and said bottom wall of said bottom portion define V-shaped grooves.

4. A device as defined in claim 1, 2 or 3, wherein one of said sides of said top portion defines an outwardly extending flange adapted to receive therein a securing strap for attaching said nested constructed devices, said utility wire and said supporting cable together.

5. A device as defined in claim 4, wherein said flange includes a slot to receive said strap therethrough.

6. A device as defined in claim 4, wherein said flange consists of a U-shaped opening receiving said strap therein.

7. A device as defined in claim 1, 2, 3, 4, 5 or 6 wherein said plastics material is polyvinylchloride.

8. A device as defined in claim 1, wherein said plastics material is resilient whereby nesting of said bottom portion in said top portion is accomplished by forcingly inserting said bottom portion between said sides of said top portion which flex outwardly.

* * * * *